(12) United States Patent
Cahill

(10) Patent No.: US 9,205,918 B2
(45) Date of Patent: Dec. 8, 2015

(54) SYSTEM AND METHOD FOR MAXIMUM BRAKING

(71) Applicant: GOODRICH CORPORATION, Charlotte, NC (US)

(72) Inventor: Eric Daniel Cahill, Troy, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 148 days.

(21) Appl. No.: 14/075,794

(22) Filed: Nov. 8, 2013

(65) Prior Publication Data
US 2015/0129368 A1    May 14, 2015

(51) Int. Cl.
| | | |
|---|---|---|
| *B60T 8/88* | (2006.01) | |
| *B64C 25/44* | (2006.01) | |
| *F16D 55/24* | (2006.01) | |
| *F16D 65/14* | (2006.01) | |
| *B60T 7/06* | (2006.01) | |
| *B60T 8/17* | (2006.01) | |
| *B60T 17/22* | (2006.01) | |
| *F16D 121/18* | (2012.01) | |

(52) U.S. Cl.
CPC . *B64C 25/44* (2013.01); *B60T 7/06* (2013.01); *B60T 8/1703* (2013.01); *B60T 17/22* (2013.01); *F16D 55/24* (2013.01); *F16D 65/14* (2013.01); *F16D 2121/18* (2013.01)

(58) Field of Classification Search
CPC ............ B60T 7/06; B60T 8/17; B60T 8/171; B60T 8/1703; F16D 55/24; F16D 65/14
USPC .......................... 303/3, 15, 20, 126
See application file for complete search history.

(56) References Cited

U.S. PATENT DOCUMENTS

| | | | |
|---|---|---|---|
| 4,822,113 | A | 4/1989 | Amberg et al. |
| 2001/0045771 | A1 | 11/2001 | Corio et al. |
| 2004/0178028 | A1* | 9/2004 | Farmer et al. ............. 188/162 |
| 2008/0154445 | A1* | 6/2008 | Goodman et al. ............ 701/3 |
| 2008/0258547 | A1* | 10/2008 | Ralea et al. ................ 303/122 |
| 2008/0258548 | A1* | 10/2008 | May et al. .................. 303/139 |
| 2011/0040466 | A1* | 2/2011 | Hill et al. ................... 701/74 |
| 2013/0092787 | A1* | 4/2013 | Polubinski ................. 244/50 |
| 2013/0175403 | A1* | 7/2013 | Spray ........................ 244/235 |
| 2015/0151728 | A1* | 6/2015 | Iordanidis et al. ......... 303/126 |

FOREIGN PATENT DOCUMENTS

| | | |
|---|---|---|
| EP | 2284054 | 2/2011 |
| EP | 2615005 | 7/2013 |
| WO | 2005087563 | 9/2005 |

OTHER PUBLICATIONS

Extended European Search Report dated Apr. 30, 2015 in European Application No. 14191740.1.

* cited by examiner

*Primary Examiner* — Christopher Schwartz
(74) *Attorney, Agent, or Firm* — Snell & Wilmer, LLP

(57) ABSTRACT

Systems and methods for reducing the speed of an aircraft are disclosed herein. An electronic brake control system may include a first braked wheel of a landing gear system, a brake pedal electronically coupled to the first braked wheel, and a first actuator. The first actuator may be configured to deliver a scalable clamping force on the first braked wheel via a brake stack. The first actuator may be configured to deliver an emergency maximum clamping force on the first braked wheel in response to the electronic brake control unit being in an emergency condition braking mode and a signal being received proportional to the brake pedal displacement. The emergency maximum clamping force results in the first actuator being driven in an overdriven state.

15 Claims, 5 Drawing Sheets

SYSTEM AND METHOD FOR MAXIMUM BRAKING

FIELD OF INVENTION

The present disclosure relates to braking the wheels of aircraft landing gear.

BACKGROUND

Vehicle wheels, such as aircraft landing gear, are typically equipped with brakes in order to slow and/or stop the vehicle. For example, aircraft brakes are used to stop an aircraft after landing or during a rejected take-off ("RTO") braking stop. Aircraft braking systems may be electric or hydraulic braking systems.

SUMMARY

Systems and methods for reducing the speed of an aircraft are disclosed herein. An electronic brake control system may include a first braked wheel of a landing gear system, a brake pedal electronically coupled to the first braked wheel and a first actuator. The first actuator may be configured to deliver a scalable clamping force on the first braked wheel via a brake stack. The first actuator may be configured to deliver an emergency maximum clamping force on the first braked wheel in response to a controller being in an emergency braking mode and a signal being received indicating braking pedal displacement. The emergency maximum clamping force result in the first actuator being driven in an overdriven state.

A method of reducing the speed of an aircraft may include determining that an emergency condition is occurring and signaling an electronic actuator array to operate in an overdrive condition to deliver a one-time use maximum clamping force to a brake stack. This signal may be delivered in response to both the determination that the emergency condition is occurring and in response to a brake pedal displacement greater than about 90 percent. The brake stack may apply a clamping force on a landing gear wheel in response to receiving the signal to operate in the overdrive condition.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Braking systems may be designed for long spans of the elements therein. However, it may be desirable to achieve a short stopping distance regardless of the effects on elements of the braking system. For instance, a system that destroys a portion of the braking system but results in no loss of life may be more desirable compared to a system which is limited to achieve sustainable braking system.

Figure 1:
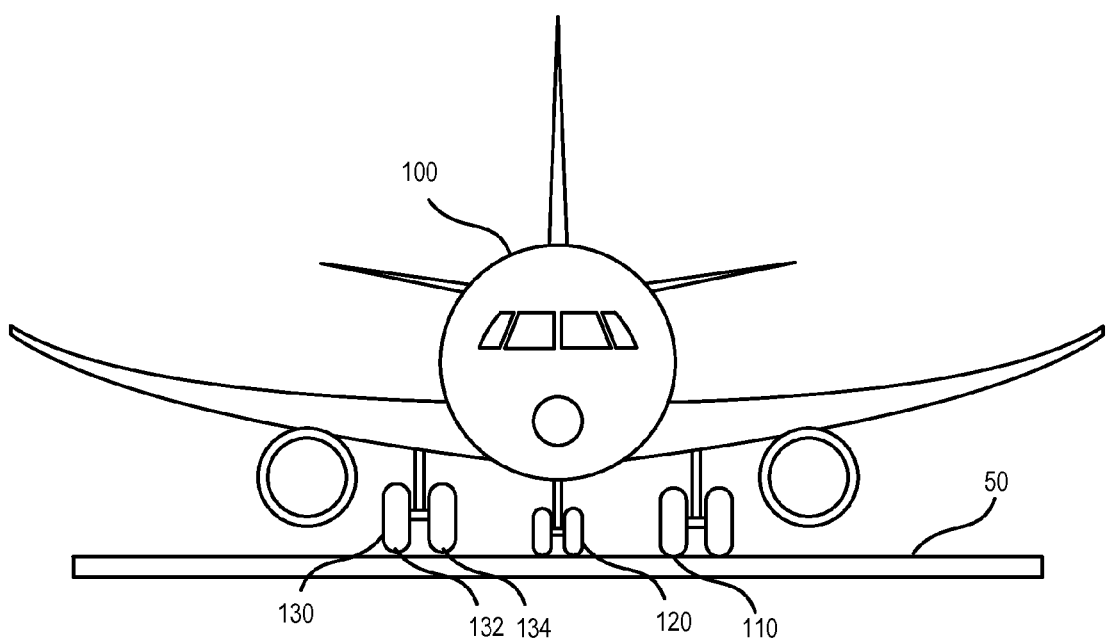
FIG. 1 illustrates, in accordance with various embodiments, a front view of an aircraft on the ground.
Figure 2:
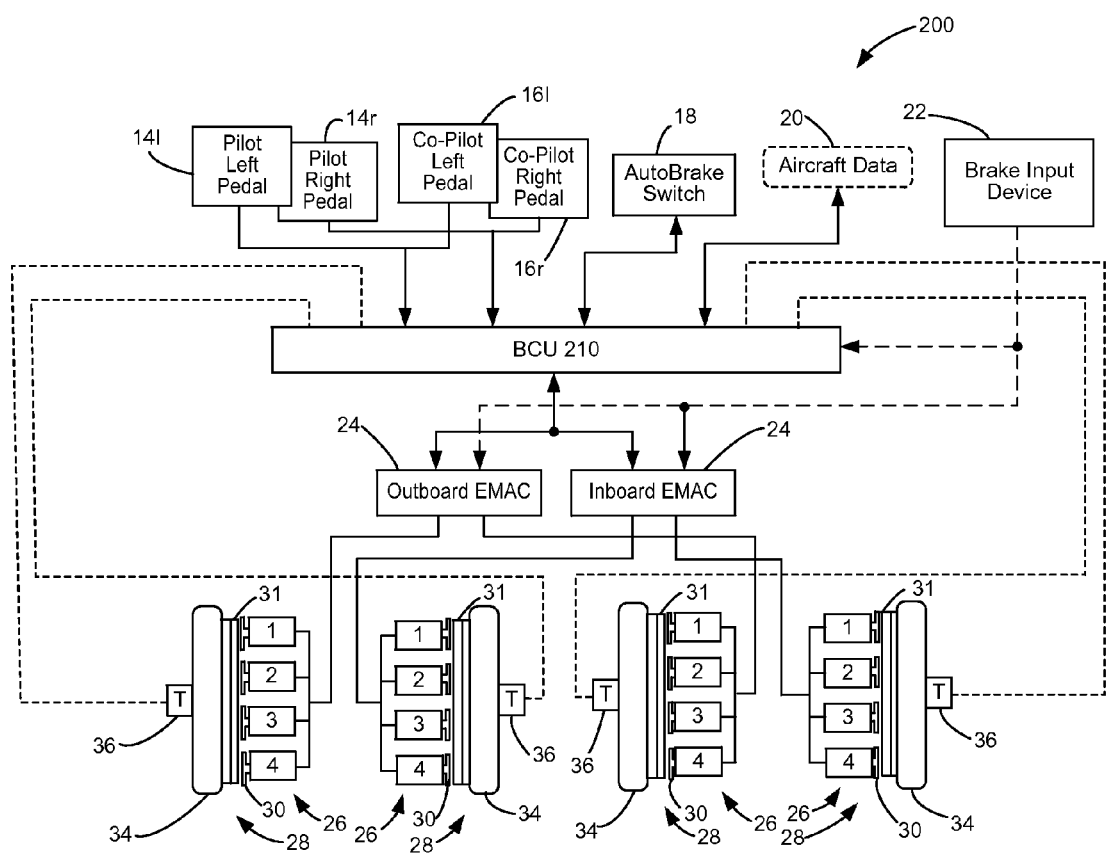
FIG. 2 illustrates, in accordance with various embodiments, a brake control system.

In accordance with various embodiments and with reference to FIGS. 1 and 2, brake control system 200 may comprise a brake control unit (BCU) 210. In accordance with various embodiments the brake control unit 210 may receive an input brake command indicative of a desired amount of braking. For example, in various aircraft embodiments, brake pedals 14*l*, 14*r*, 16*l*, 16*r* within the cockpit of the aircraft may be depressed to indicate a desired amount of braking. As discussed herein one brake pedal 14*l*, 14*r*, 16*l*, 16*r* may refer to one or more brake pedal 14*l*, 14*r*, 16*l*, 16*r*. The desired amount of braking may take the form of an input brake command. In response to the input brake command, the BCU 210 derives an output command signal in the form of a brake control signal or multiple brake control signals. Collectively, the brake control signals are intended to effectuate the desired amount of braking in relation to the input brake command.

Hydraulic braking systems may be configured to supply a maximum brake clamp force which is directly proportional to the maximum hydraulic pressure available. Electronic braking systems are not limited in this way. Electric braking systems may be configured to supply a variety of braking forces. Historically, in an electronic braking system, braking force that is acceptable for the braking system to both stop the plane over an acceptable stopping distance and achieve an acceptable life span of the braking system components is identified as an acceptable maximum braking force level. Brake pedals displacement such as through force applied by the pilot may be scaled such that a low amount of brake pedals displacement exerts a low amount of braking force, or no amount of braking force, by the electronic braking system and a maximum or near maximum amount of brake pedals displacement results in the preset acceptable maximum amount of force being applied. Thus, the force applied by the pilot (e.g. brake pedals displacement) may be scaled between no force applied by the braking system and the acceptable maximum braking force.

In various embodiments, brake control system 200 is configured to establish an emergency maximum braking level which puts the brake components into an overdrive condition for a short period of time. The braking level associated with the overdrive condition, which may destroy hardware, such as one or more actuators or associated electronics of the electromechanical brake actuator assembly of brake control system 200, may result in the force being applied on the wheels to be higher than conventional brake control systems and/or result in a shortened stopping distance of the aircraft. Stated another way, a high brake clamp force, such as an emergency maximum clamp force, for a one-time emergency stop may be provided using brake control system 200.

For example, with renewed reference to FIG. 1, a front view of an aircraft 100 on ground 50 is illustrated according to various embodiments. Aircraft 100 may comprise landing gear including left main landing gear ("LMLG") 110, nose landing gear ("NLG") 120, and right main landing gear ("RMLG") 130. Though a t-gear type landing gear aircraft is depicted, it should be appreciated that the concepts described herein are applicable to aircraft having multiple axle pairs per bogie gear or truck and aircraft with more than two gears. Each gear may comprise two wheels. For example, RMLG 130 comprises right outboard wheel 132 and right inboard wheel 134. A brake control system 200 may be applied to any wheel of any landing gear structure. In various embodiments, aircraft 100 may comprise any number of gears and each gear may comprise any number of wheels. Additionally, the concepts disclosed herein variously apply to two wheel aircraft (e.g. one wheel for each main landing gear).

In accordance with various embodiments and with reference to FIG. 2, a brake control system 200 may be configured to providing braking with respect to the aircraft wheels, of which two wheels may be mounted to a left landing gear structure of an aircraft, and two wheels may be mounted to a right landing gear structure of the aircraft. Each wheel may be coupled to a brake stack assembly. Braking force may be applied to the brake stack assembly using electromechanical brake actuators (EBAs) and/or an electromechanical brake actuator assembly. Each wheel may be associated with a plurality of EBAs, such as four or six EBAs. It will be appreciated that various embodiments of the disclosed brake control system 200 (with brief reference to FIG. 2) may be extended to aircraft that include any number of wheels, any number of landing gear trucks, any number of axles per truck, and/or any number of EBAs.

For example, in various embodiments, an aircraft wheel and brakes comprise a non-rotatable wheel support, a wheel rotatably mounted to the wheel support, and a brake disk stack having alternating rotor and stator disks mounted with respect to the wheel support and wheel for relative axial movement. Each rotor disk is coupled to the wheel for rotation therewith and each stator disk is coupled to the wheel support against rotation. A back plate is located at the rear end of the disk stack and a brake head is located at the front end. The brake head may house a plurality of EBAs that further comprise reciprocating rams that extend to compress the brake disk stack against the back plate. Torque is taken out by the stator disks through a static torque tube or the like. An aircraft brake may include the brake disk stack, the brake head, and at least one EBA mounted to, for example, the brake head. The EBA may include a housing, a reciprocating ram and a motive device operatively connected to the reciprocating ram for selectively moving the reciprocating ram into and out of forceful engagement with the brake disk stack for applying and releasing braking force. The EBA is mounted to a surface of the brake head that is parallel to a friction surface of the brake disk stack.

Referring initially to FIG. 2, there is shown an exemplary brake control system 200 having architecture as disclosed herein. The exemplary electrical brake system includes a brake system control unit (BCU) 210 configured to carryout braking operations of the aircraft 100. The BCU 210 is configured to receive various operator inputs, such as left and right pilot brake pedal signals from left and right pilot brake pedals 14*l* and 14*r*, and left and right co-pilot brake pedal signals from left and right co-pilot brake pedals 16*l* and 16*r*. The brake pedal signals can be generated, for example, via LVDTs (linear variable differential transformers—not shown) operatively coupled to the respective pedals. As the brake pedals are depressed, each respective LVDT generates a voltage signal corresponding to the degree of pedal deflection, and this voltage signal can be provided to the BCU 210. As will be appreciated, other known methods for generating the brake pedal signals may also be employed, including encoders, potentiometers, or the like.

The BCU 12 may also receive other operator inputs, such as data from an autobrake switch 18 for configuring autobrake logic. The autobrake switch 18 may include several settings, such as an enable/disable input, an auto braking level input (e.g., low, medium, high) and a rejected take off (RTO) input (e.g., for enabling or disabling RTO functionality). The BCU 210 may also receive other aircraft 100 data 20, such as discrete data (e.g., sensor data such as weight-on-wheels, landing gear up/down, etc.), analog data (e.g., force data, temperature data, etc.), serial data, etc.

The BCU 210 is communicatively coupled to one or more electro-mechanical actuator controllers (EMACs) 24, wherein the BCU 210 provides a brake force signal to the respective EMACs 24 during normal braking operations. Preferably, the coupling is via a serial communication link, although data also can be exchanged via discrete and/or analog connections. The BCU 210 is configured to derive the brake force signal based on brake data generated by the brake pedals 14*l*, 14*r*, 16*l*, 16*r*, and/or autobrake and antiskid control.

A brake input device 22, preferably a combination parking brake/emergency brake device (e.g., a handle, lever, pedal, or the like), controller and/or logic, (e.g., to determine an RTO condition is occurring) provides a brake command signal to each EMAC 24. The brake command signal can be generated using known techniques, such as an LVDT as described above with respect to the brake pedals 14*l*, 14*r*, 16*l*, 16*r*, or via an encoder or potentiometer configured to provide data corresponding to deflection or rotation of the brake input device 22. As will be appreciated, other known methods of generating the brake command signal may also be employed. Preferably, the brake input device includes a mode selector to indicate when normal or parking/emergency braking is desired. For example, the brake input device 22 may include contacts that are open when the brake input device is in a first position (e.g., rotated to the left or pushed inward) and closed when the brake input device is in a second position (e.g., rotated to the right or pulled outward). Alternatively, the brake mode selector may be separate from the brake input device 22. The brake input device 22 can also provide separate braking signals for respective left and right side brakes.

The EMACs 24 are electrically coupled to one or more actuators 26 of a brake assembly 28, wherein each brake assembly 28 includes the one or more actuators 26, corresponding rams 30 operatively coupled to each actuator 26, and a brake disk stack 31 having a plurality of rotors coupled for rotation with a wheel 34 and stators rotationally fixed with respect to the wheel 34. Each actuator 26 and ram 30 are configured for forceful engagement with the brake disk stack 31 so as to provide a brake force to a corresponding wheel 34. Wheel speed sensors 36 provide wheel speed data to the BCU 210 for implementing anti-skid and/or autobrake functions.

As discussed above, various embodiments of the brake control system 200 include an upper level controller, or brake control unit (BCU) 210, for providing overall control of the brake control system 200 as depicted in FIG. 2. According to various embodiments, a plurality of BCUs 210 may be coupled to brake control system 200 configured to provide redundancy to the brake control system 200.

In accordance with various embodiments and with continued reference to FIG. 2, the BCU 210 may receive an input brake command indicative of a desired amount of braking. For example, brake pedals 14l, 14r, 16l, 16r, within the cockpit of the aircraft may be pressed and/or moved to indicate a desired amount of braking, or an autobrake switch may generate the input brake command. The input brake command is then derived from the distance brake pedals 14l, 14r, 16l, 16r are pressed 270 (i.e., brake pedal displacement), the force applied on brake pedals 14l, 14r, 16l, 16r and/or from the autobrake selection.

A sensor, such as timer 280, may measure the length of time the brake pedals 14l, 14r, 16l, 16r are held in a position and/or held in a position above a threshold. In response to the input brake command, the BCU 210 derives an output command signal in the form of a brake control signal or multiple brake control signals. Collectively, the brake control signals are intended to effectuate the desired amount of braking in relation to the input brake command.

Figure 3:
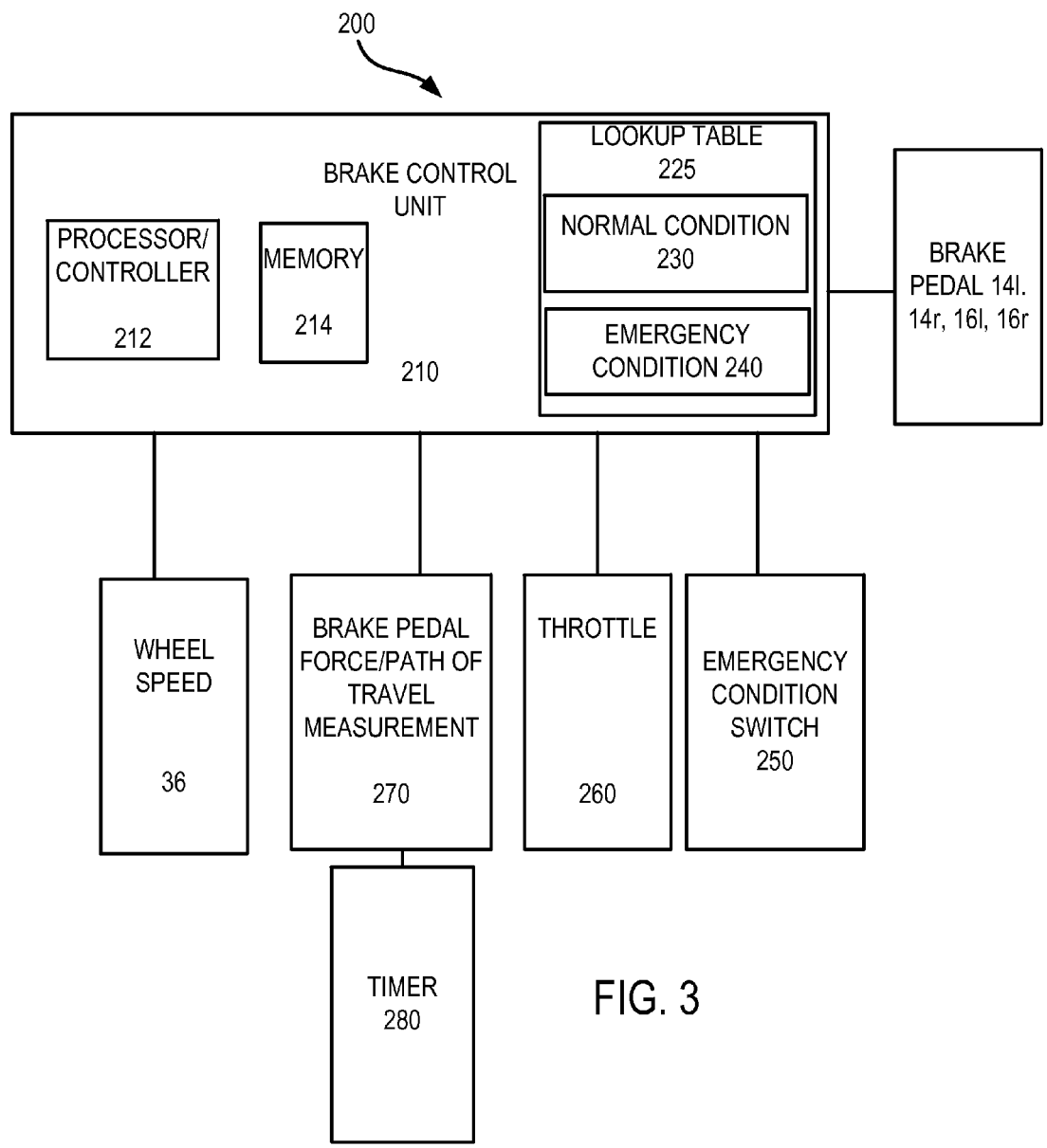
FIG. 3 illustrates, in accordance with various embodiments, a brake control system.

With reference to FIG. 3, brake control unit 210 and/or brake control system 200 may comprise a computing device (e.g., processor 212) and an associated memory 214. Memory 214 may comprise an article of manufacture including a tangible, non-transitory computer-readable storage medium having instructions stored thereon that, in response to execution by a computing device (e.g., processor 212), cause the computing device to perform various methods. Braking force may be determined based on the brake control system 200 referencing a lookup table 225, such as to reference a normal condition 230 mode (e.g., first lookup table) or an emergency condition 240 mode (e.g., second lookup table). Stated another way, a force level designated by a lookup table. An emergency condition may be automatically sensed by sensors associated with the path of travel of aircraft 100 and/or related conditions or through a crew member toggling an emergency condition switch 250. For instance, a physical or virtual emergency condition switch 250 may be coupled to the BCU 210. The BCU 210 may be coupled to the throttle 260 of an aircraft such as to automatically detect a rejected takeoff condition (RTO).

Figure 4:
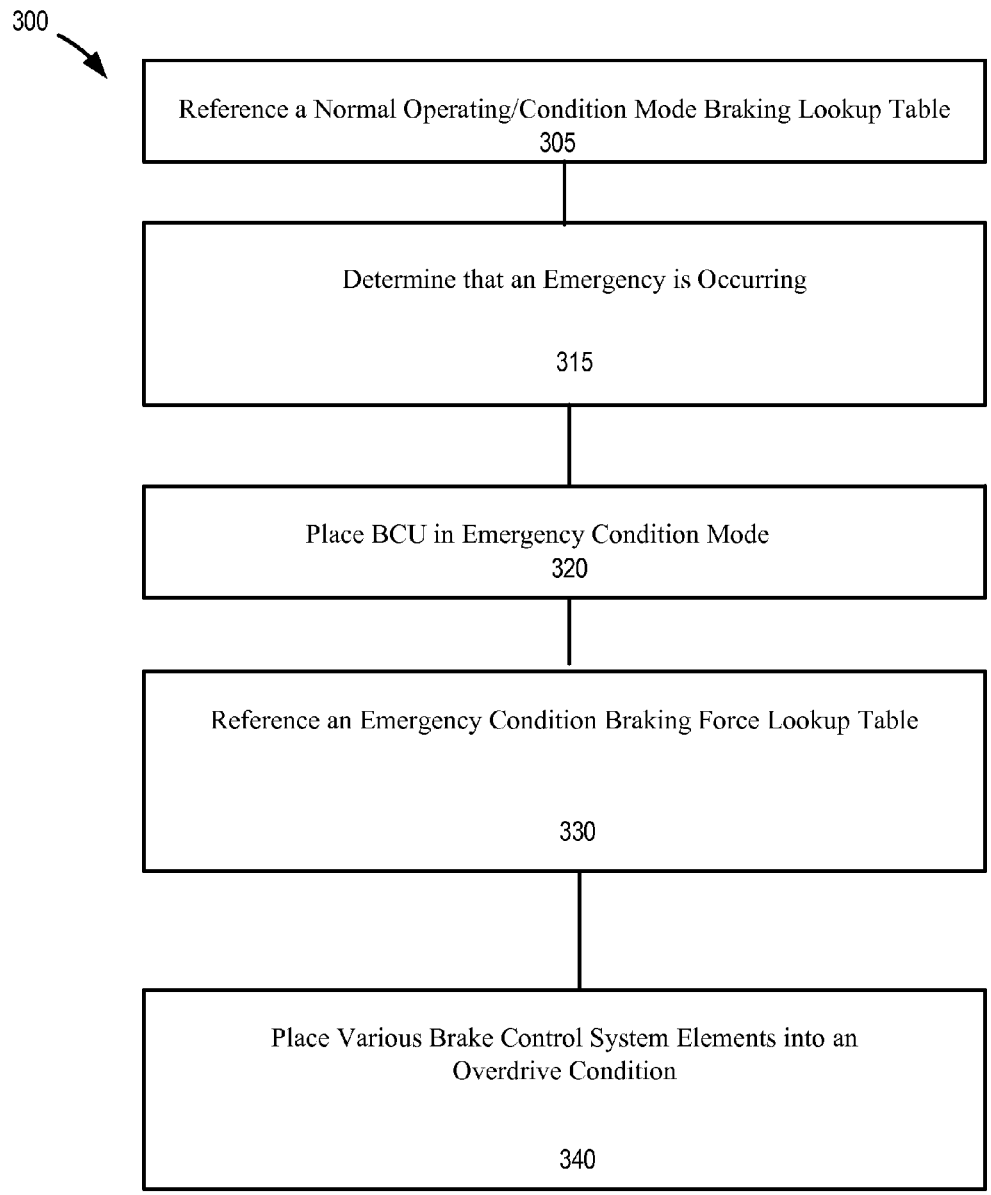
FIG. 4 illustrates, in accordance with various embodiments, a process for engaging an emergency mode of the brake control system.

In accordance with various embodiments and with reference to FIG. 4, in response to normal operating conditions, the aircraft 100 brake control system 200 may be configured to perform a brake control process 300 that makes reference to a normal condition 230 operating mode braking lookup table 225 (step 305). For instance, in response to the pilot pressing a brake pedals 14l, 14r, 16l, 16r at or near the maximum level, (such as greater than about 95%), the normal operating mode braking lookup table may designate an amount of force to be supplied to the wheel. This amount of force is an amount of force that that does not place the brake control system 200 components in an overdrive condition. At any point in time, a process 300 for engaging the emergency condition 240 mode may be performed by brake control system 200 either automatically in response to a sensed condition or manually such as in response to a manual selection of an emergency mode by an operator such as a pilot. For instance, in response to the systems of the aircraft 100, such as sensors coupled to the BCU 210, determining the aircraft 100 is experiencing a rejected takeoff, the BCU 210 of the brake control system 200 may automatically engage an emergency condition 240 mode (step 315). In the alternative, in response to the pilot pressing at or near the maximum braking position of the brake pedals for a predetermined amount of time and/or in response to toggling of an emergency condition switch 250 (as depicted in FIG. 3), the brake control unit 210 may determine, via received signals associated with emergency condition switch 250 and/or brake pedal position and/or duration, that an emergency is occurring and place the brake control system 200 into an emergency condition 240 mode (step 320). In the emergency condition 240 mode, an emergency condition 240 braking force lookup table 225 may be referenced by the BCU 210 (step 330). In accordance with emergency condition 240 braking force lookup table 225, the maximum level of braking force available in emergency condition 240 mode may place various brake control system 200 elements into an overdrive condition (step 340). The pilot may indicate that maximum braking is requested, such as by pressing the brake pedals to generate brake pedal displacement of/or greater than about 90%. Thus, in response to this indication, brake control system 200 may apply the emergency braking clamping force. The brake control system 200 and/or elements thereof may be declared "destroyed" after one time use in the emergency condition 240 mode and/or after braking that places brake control system 200 elements into an overdrive condition. Destroyed elements are generally at least one of inspected, repaired and/or replaced prior to further use in a braking environment. Stated another way, the actuator or related electronics may be at least one of: destroyed after braking that places the first actuator into an overdrive condition, deemed destroyed after a prescribed period of time, and/or requires at least one of inspection and test after a lesser period of time than the a prescribed period of time. The prescribed period of time may be any suitable period of time.

Figure 5:
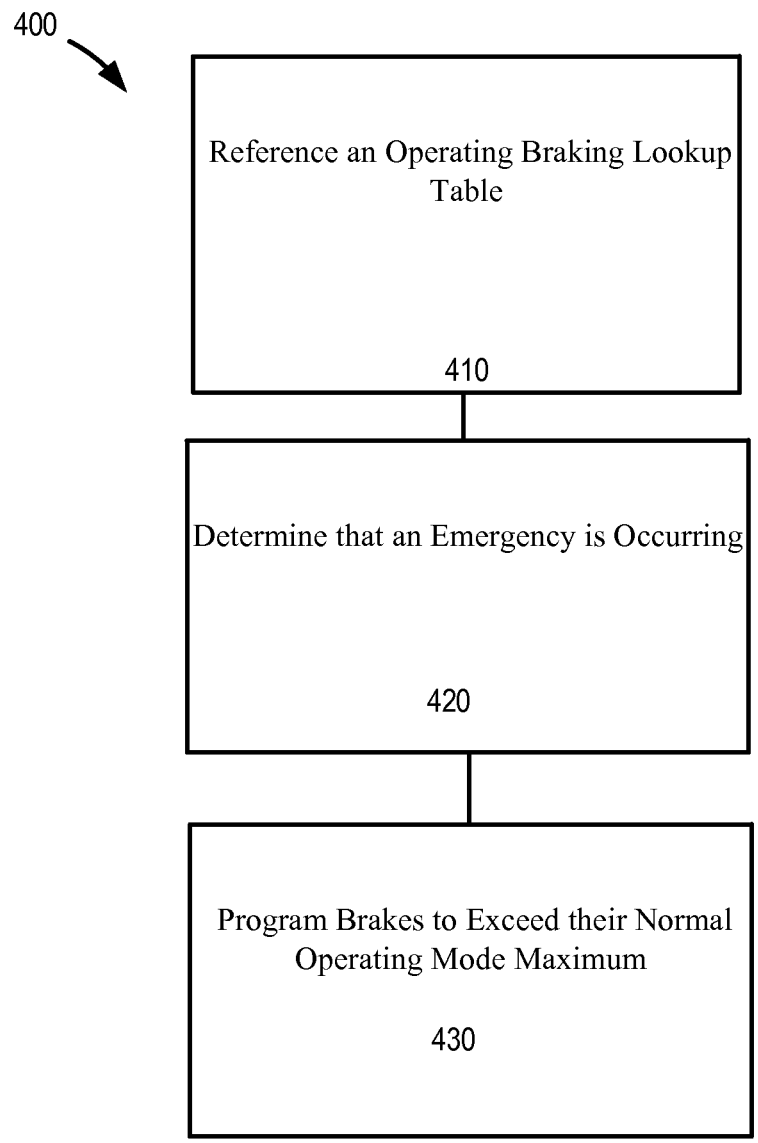
FIG. 5 illustrates, in accordance with various embodiments, a process for placing components into an overdrive condition.

In accordance with various embodiments and with reference to FIG. 5, a process 400 for placing components into an overdrive condition is disclosed. In response to normal operating conditions, aircraft 100 may reference an operating mode braking lookup table 225, such as normal condition 230 operating lookup table 225, as depicted in FIG. 3 (step 410). In general, in response to the pilot pressing the brake pedals at or near the maximum level, (such as greater than about 90%) based on the normal condition 230 operating lookup table 225 the clamping force applied to the wheels does not place the brake control system 200 components into an overdrive condition. Thus, this clamping force may be scalable. An emergency condition may be where enhanced stopping power is desired. In response to this scenario, an emergency condition lookup table, such as emergency condition 240 lookup table 225, as depicted in FIG. 3, may be referenced which places one or more brake control system 200 components into an overdrive condition. The normal condition 230 operating lookup table 225 may, in the alternative, comprise an auxiliary set of instructions accessible in response to the BCU 210 receiving signals indicative of an emergency occurring which places one or more brake control system 200 components into an overdrive condition (not depicted). For instance, in response to the pilot pressing at or near the maximum braking position of the brake pedals for a predetermined amount of time, such as substantially immediately, about 3 seconds, about 5 seconds or about 7 seconds, a signal may be sent to the BCU 210 and the brakes may be programmed to exceed their normal operating mode maximum and operate at level (emergency maximum) where the power drive circuit of one or more actuators of the braking system will overheat and ultimately fail (step 420, 430). This emergency maximum may be sustained for a limited number of cycles. For example, overheating may occur after about 40 seconds of braking. In various embodiments, the actuator is overdriven during a RTO which will generally require replacement of various elements of the braking system. In other cases, such as a hard stop, elevated heat produced as compared with normal operation may deem inspection beneficial.

According to various embodiments, in response to an emergency condition being detected and/or experienced a change may be made from to a first pedal vs. brake force curve/lookup table to a second pedal vs. brake force curve/lookup table. For instance, on the first pedal vs. brake force curve/lookup table 50% brake pedal displacement may achieve about 50% of normal braking force, while on the second pedal vs. brake force curve/lookup table 50% brake pedal displacement may achieve about 80% braking force in an emergency mode. Moreover, on the first pedal vs. brake force curve 100% brake pedal displacement may achieve about 100% of normal braking force, while on the second pedal vs. brake force curve 100% brake pedal displacement may achieve about 160% of normal braking force.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electronic brake control system comprising:
   a first braked wheel of a landing gear system;
   a brake pedal electronically coupled to a brake control unit; and
   a first actuator, wherein the first actuator is configured to deliver a scalable clamping force on the first braked wheel via a brake stack,
   wherein the first actuator is configured to deliver the scalable clamping force on the first braked wheel in accordance with a first force level designated by a first lookup table;
   wherein the first actuator is configured to deliver an emergency maximum clamping force on the first braked wheel, in accordance with a second force level designated by a second lookup table, in response to the electronic brake control system being in an emergency braking mode and at least one of:
   a signal being received at the brake control unit, proportional to a brake pedal displacement, and
   an automatic emergency command,
   wherein the emergency maximum clamping force results in the first actuator being driven in an overdriven state.

2. The electronic brake control system according to claim 1, further comprising the electronic brake control system changing from a normal operating condition to the emergency braking mode in response to the brake control unit determination of an emergency condition occurring.

3. The electronic brake control system according to claim 2, wherein the determination of the emergency condition occurring is based on sensors automatically sensing the emergency condition.

4. The electronic brake control system according to claim 3, wherein the sensed emergency condition is at least one of a rejected takeoff and the brake pedal displacement being greater than about 90 percent for longer than a predetermined period of time.

5. The electronic brake control system according to claim 4, wherein the predetermined period of time is at least one of about 3 seconds, about 5 seconds, and about 7 seconds.

6. The electronic brake control system according to claim 2, wherein the emergency condition is manually engaged via toggling a switch.

7. The electronic brake control system according to claim 1, wherein the first actuator is deemed at least one of:
   destroyed after braking that places the first actuator into an overdrive condition,
   deemed destroyed after a prescribed period of time, and
   requires at least one of inspection and test after a lesser period of time than the prescribed period of time.

8. A method of reducing a speed of an aircraft comprising;
   determining by a brake control unit that an emergency condition is occurring in response to receiving a signal of at least one of:
   a brake pedal displacement greater than about 90 percent, and
   an emergency command via a brake input device; and signaling an electronic actuator array to operate in an overdrive condition to deliver a maximum clamping force to a brake stack, the electronic actuator array configured to deliver a scalable clamping force to the brake stack in a normal operating condition in accordance with a first force level designated by a first lookup table and to deliver the maximum clamping force in the emergency condition in accordance with a second force level designated by a second lookup table.

9. The method of claim 8, wherein the determination of the emergency condition occurring is based on sensors automatically sensing the emergency condition.

10. The method of claim 9, wherein the sensed emergency condition is at least one of a rejected takeoff and the brake pedal displacement is greater than about 95 percent of a total brake pedal displacement potential for longer than a predetermined duration of time.

11. The method of claim 10, wherein the predetermined duration of time is about 5 seconds.

12. The method of claim 9, wherein the emergency condition is manually engaged via the toggling of a switch.

13. The method of claim 9, wherein at least a portion of the electronic actuator array is deemed destroyed after braking that places the electronic actuator array into the overdrive condition.

14. The method of claim 9, wherein at least a portion of the electronic actuator array is mechanically destroyed after braking that places the electronic actuator array into the overdrive condition.

15. The method of claim 9, further comprising the brake stack applying the maximum clamping force on a landing gear wheel in response to receiving a signal to operate in the overdrive condition.

* * * * *